J. Robingson,
Reciprocating Saw-Mill,
N°14,930. Patented May 20, 1856.
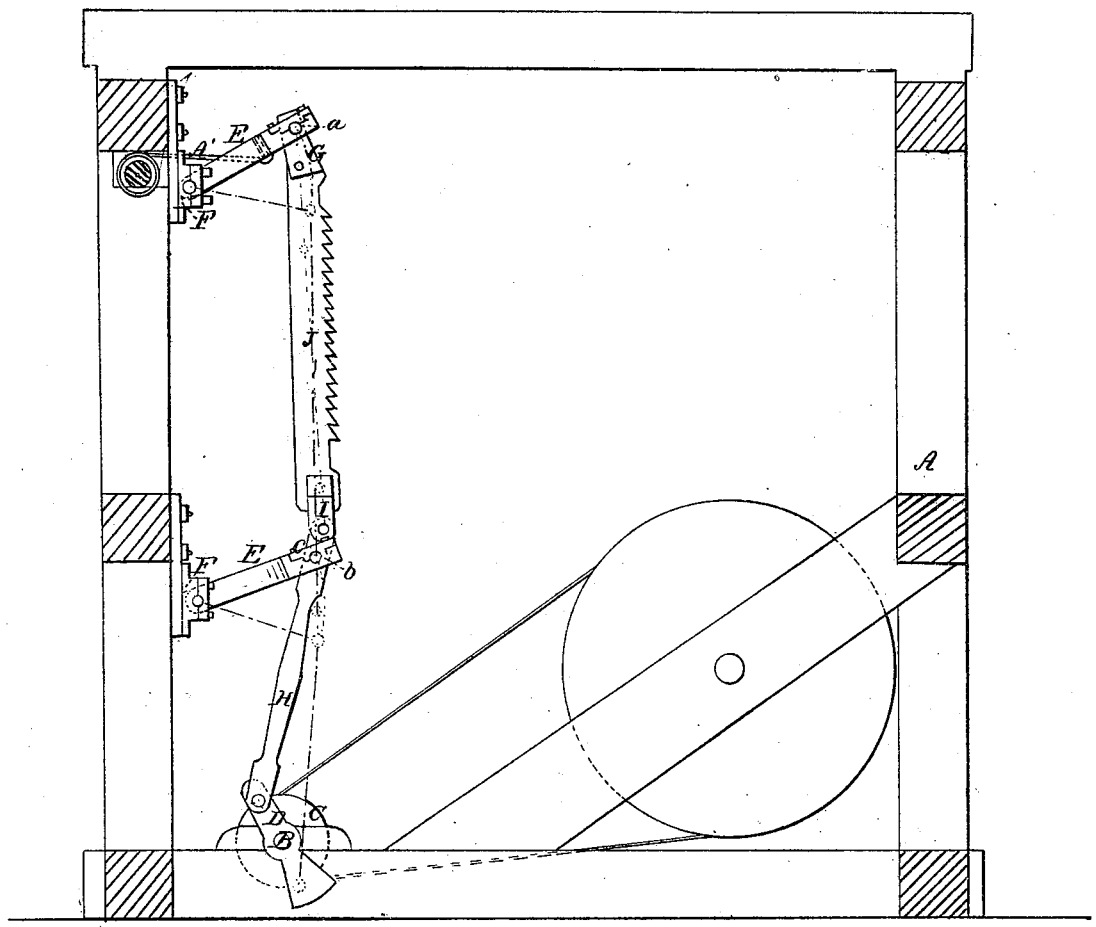

UNITED STATES PATENT OFFICE.

JOHN ROBINGSON, OF NEW BRIGHTON, PENNSYLVANIA.

METHOD OF HANGING RECIPROCATING SAWS.

Specification of Letters Patent No. 14,930, dated May 20, 1856.

*To all whom it may concern:*

Be it known that I, JOHN ROBINGSON, of New Brighton, in the county of Beaver and State of Pennsylvania, have invented a new and useful Improvement in Hanging and Working Reciprocating Saws; and I do hereby declare that the following is a full, clear, and exact description of the same, reference being had to the annexed drawing, making a part of this specification, said drawing being a side view of my improvement.

My invention consists in attaching the saw to vibrating frames, in a peculiar way as will be hereinafter fully shown and described.

To enable those skilled in the art to fully understand and construct my invention, I will proceed to describe it.

A, represents a rectangular framing, constructed in any proper manner, to support the working parts of the machine.

B, represents a shaft placed in the lower part of the framing, said shaft having a pulley C, upon it, and a crank D, at one end.

E, E, represent two frames, the outer ends of which are provided with journals which are fitted and work in bearing F, attached to the framing A.

The inner end of the upper frame E, has a pendant or arm G, attached to it, the upper end of the pendant or arm being attached to a small shaft (*a*) the ends of which are fitted in bearings at the inner end of said frame.

H, is a pitman the lower end of which is attached to the crank D; the upper end of the pitman has a small shaft (*b*) passing transversely through it, the ends of said shaft being fitted in bearings (*c*) at the inner end of the lower frame E. The upper end of the pitman just above the shaft (*b*) is pivoted to a plate I, which is attached to the lower end of the saw J. The upper end of the saw J, is attached to the lower part of the pendant or arm G.

The upper frame E, is acted upon by a spring A', which serves to equalize the motion of the saw.

The operation is as follows. As the shaft B, is rotated the two frames E, E, will have a vibratory or swinging motion communicated to them, and the saw J, in consequence of being connected to the frames as shown, viz., by means of the pendant or arm G, and the pitman H, will have a rocking motion given it, the lower teeth of the saw cutting the log, and then receding, the upper teeth acting successively in the same way, the last tooth that enters the log cutting last. By this arrangement the several teeth of the saw as they perform their work recede, and the saw dust is allowed to pass freely out of the kerf; the saw also requires but a small stroke, and will cut a log four feet in diameter, with an 8 in. crank equally as well as a log only half that diameter. The saw also may be operated with comparatively a small expenditure of power, and cuts rapidly. There is not much friction in the working of the saw, not much lubricating material is requisite, and the saw in consequence of the short stroke does not require to be long. The saw may in case of getting out of a vertical position, be readily plumbed, by having the bearings F, of the frames E, made adjustable, and also the bearings of the shafts (*a*) (*b*) at the inner ends of the frames E.

I do not claim merely attaching the lower end of the saw to the pitman, for that has been previously done in cases where the saw has been placed in a sash or frame, but

What I claim as new and desire to secure by Letters Patent, is—

Attaching the upper end of the saw J, to the pendant or arm G, which is connected to the upper frame E, and the lower end of the saw to the pitman H, just above the point of connection of said pitman, with the lower frame E, substantially as herein shown and described for the purpose specified.

JNO. ROBINGSON.

Witnesses:
CALVIN R. TUTTLE,
JAMES PENNELL.